US012634671B2

(12) United States Patent   (10) Patent No.: US 12,634,671 B2
Phan et al.                      (45) Date of Patent:     May 19, 2026

(54) SIDELINK DISCOVERY WITH USER EQUIPMENT TO USER EQUIPMENT RELAY

(71) Applicant: Nokia Technologies Oy, Espoo (FI)

(72) Inventors: Vinh Van Phan, Oulu (FI); Ling Yu, Kauniainen (FI); Mohamed Amin Nassar, Munich (DE); György Tamás Wolfner, Budapest (HU); Hannu Petri Hietalahti, Oulu (FI)

(73) Assignee: Nokia Technologies Oy, Espoo (FI)

( * ) Notice: Subject to any disclaimer, the term of this patent is extended or adjusted under 35 U.S.C. 154(b) by 522 days.

(21) Appl. No.: 17/733,185

(22) Filed: Apr. 29, 2022

(65) Prior Publication Data

US 2023/0354003 A1    Nov. 2, 2023

(51) Int. Cl.
H04W 8/00      (2009.01)
H04W 48/10     (2009.01)
H04W 88/04     (2009.01)

(52) U.S. Cl.
CPC ........... H04W 8/005 (2013.01); H04W 48/10 (2013.01); H04W 88/04 (2013.01)

(58) Field of Classification Search
CPC ..... H04W 8/005; H04W 48/10; H04W 88/04; H04W 76/14; H04W 92/18; H04W 76/11
See application file for complete search history.

(56) References Cited

U.S. PATENT DOCUMENTS

2017/0359766 A1* 12/2017 Agiwal .................. H04L 5/0048
2021/0400448 A1* 12/2021 Adjakple ................ H04W 4/40

2022/0104180 A1   3/2022 Yang et al.
2023/0217232 A1*  7/2023 Cheng ..................... H04L 67/61
                                                  370/328
2023/0319915 A1* 10/2023 Paladugu .............. H04W 76/14
                                                  370/315

FOREIGN PATENT DOCUMENTS

WO    WO 2016/099227 A1    6/2016
WO    WO 2020/092742 A1    5/2020
WO    WO 2021/232176 A1   11/2021

OTHER PUBLICATIONS

3GPP, TS 23.304 V17.0.0, Proximity based Services (ProSe) in the 5G System (5GS), (Sep. 2021).*
"3rd Generation Partnership Project; Technical Specification Group Services and System Aspects; Proximity based Services (ProSe) in the 5G System (5GS) (Release 17)", 3GPP TS 23.304 v17.2.1, (Mar. 2022), 103 pages.
International Search Report and Written Opinion for Patent Cooperation Treaty Application No. PCT/EP2023/056876 dated Jun. 16, 2023, 18 pages.

* cited by examiner

*Primary Examiner* — Mandish K Randhawa
(74) *Attorney, Agent, or Firm* — Alston & Bird LLP

(57)                ABSTRACT

Techniques for performing sidelink discovery with user equipment (UE) to UE relay are provided. An initiating UE initiates a sidelink discovery solicitation message toward relay UEs and responding UEs. A relay UE can facilitate the discovery between two or more UEs by monitoring for sidelink discovery solicitation messages and sidelink discovery solicitation responses. A responding UE in receipt of a sidelink solicitation message responds toward a relay UE and/or initiating UE via communication method that may depend on various factors. The communication method may include non-unicast communication, such as broadcast or multicast, to reduce signaling overhead in comparison to unicast communication methods.

21 Claims, 6 Drawing Sheets

100

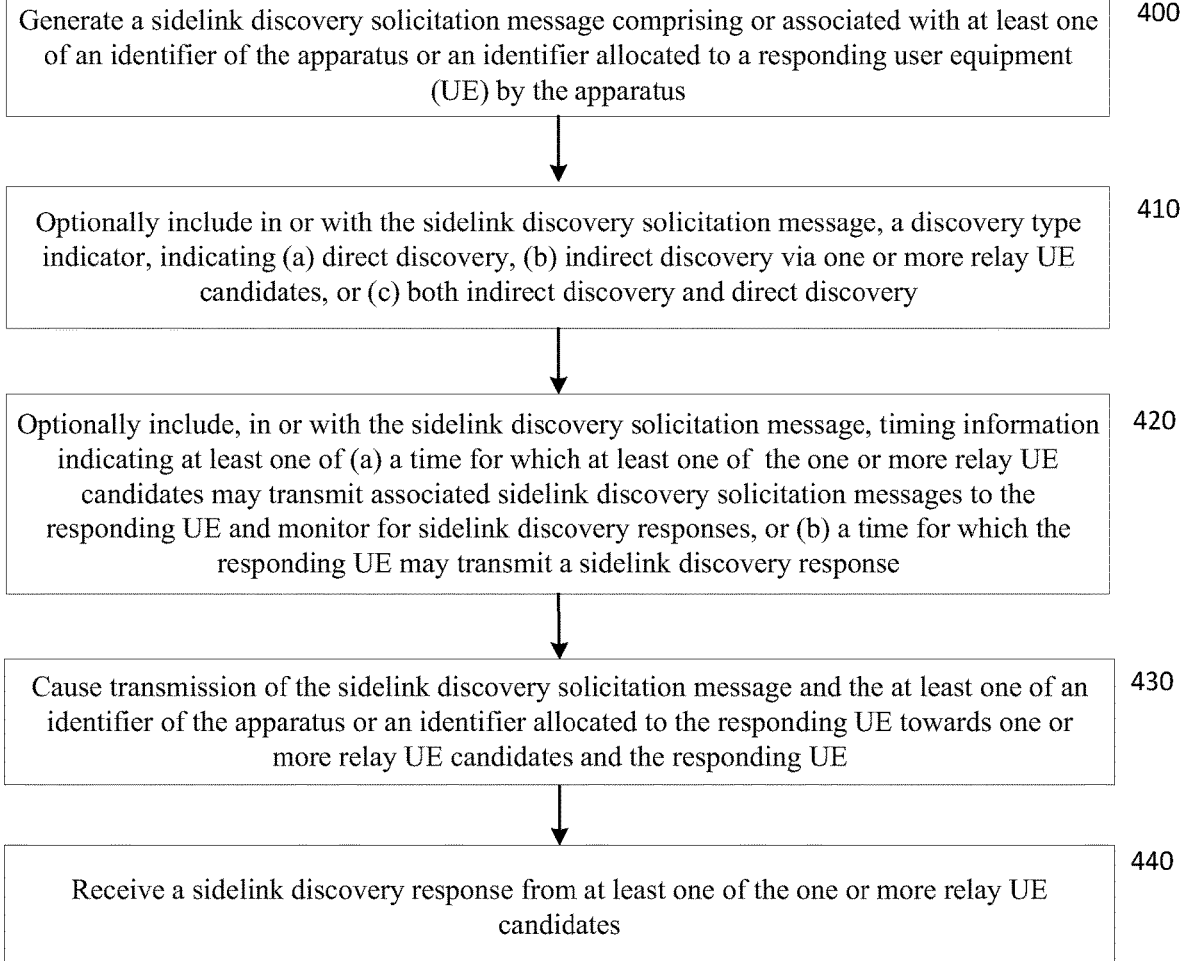

Generate a sidelink discovery solicitation message comprising or associated with at least one of an identifier of the apparatus or an identifier allocated to a responding user equipment (UE) by the apparatus    400

Optionally include in or with the sidelink discovery solicitation message, a discovery type indicator, indicating (a) direct discovery, (b) indirect discovery via one or more relay UE candidates, or (c) both indirect discovery and direct discovery    410

Optionally include, in or with the sidelink discovery solicitation message, timing information indicating at least one of (a) a time for which at least one of the one or more relay UE candidates may transmit associated sidelink discovery solicitation messages to the responding UE and monitor for sidelink discovery responses, or (b) a time for which the responding UE may transmit a sidelink discovery response    420

Cause transmission of the sidelink discovery solicitation message and the at least one of an identifier of the apparatus or an identifier allocated to the responding UE towards one or more relay UE candidates and the responding UE    430

Receive a sidelink discovery response from at least one of the one or more relay UE candidates    440

FIG. 4

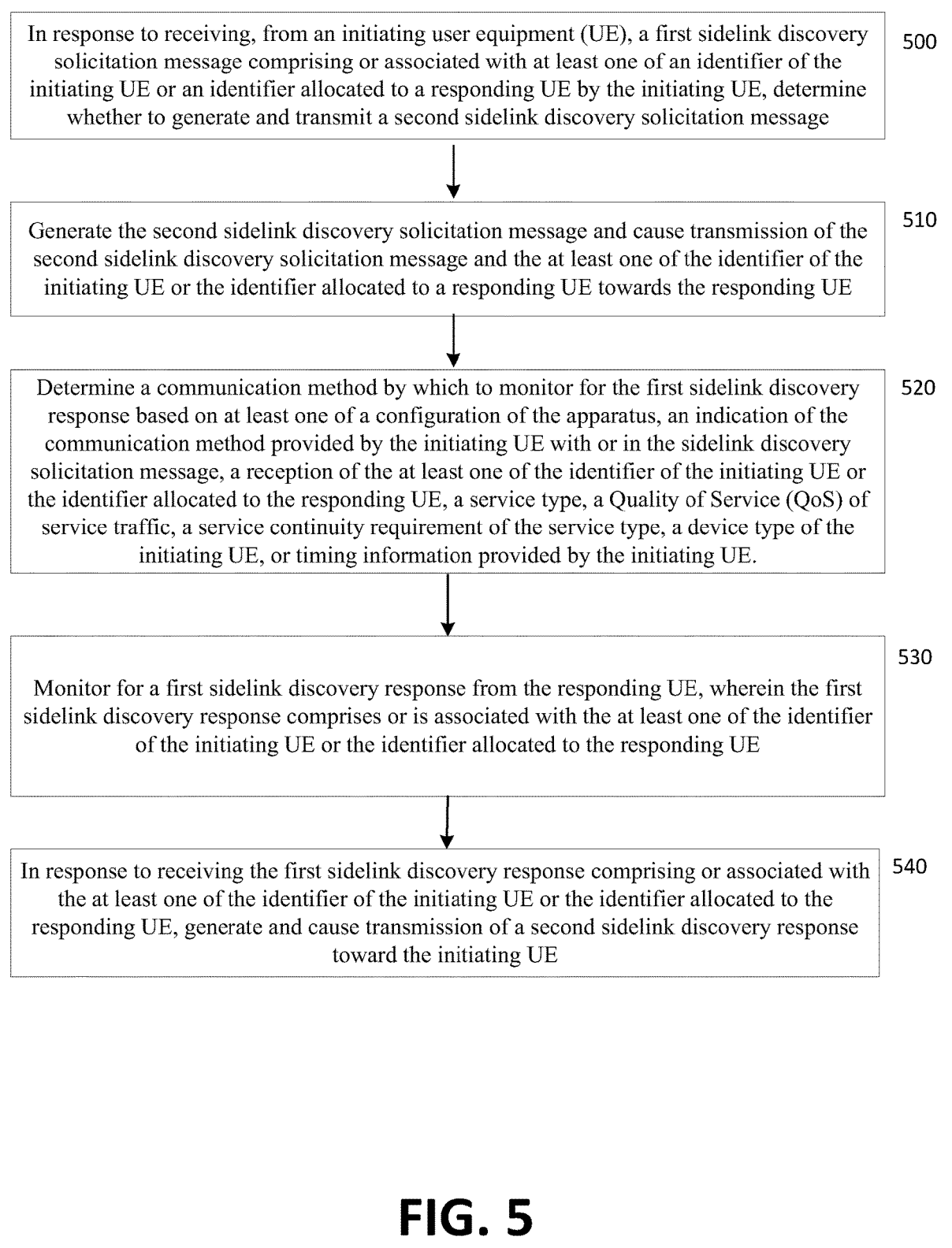

In response to receiving, from an initiating user equipment (UE), a first sidelink discovery solicitation message comprising or associated with at least one of an identifier of the initiating UE or an identifier allocated to a responding UE by the initiating UE, determine whether to generate and transmit a second sidelink discovery solicitation message          500

Generate the second sidelink discovery solicitation message and cause transmission of the second sidelink discovery solicitation message and the at least one of the identifier of the initiating UE or the identifier allocated to a responding UE towards the responding UE          510

Determine a communication method by which to monitor for the first sidelink discovery response based on at least one of a configuration of the apparatus, an indication of the communication method provided by the initiating UE with or in the sidelink discovery solicitation message, a reception of the at least one of the identifier of the initiating UE or the identifier allocated to the responding UE, a service type, a Quality of Service (QoS) of service traffic, a service continuity requirement of the service type, a device type of the initiating UE, or timing information provided by the initiating UE.          520

Monitor for a first sidelink discovery response from the responding UE, wherein the first sidelink discovery response comprises or is associated with the at least one of the identifier of the initiating UE or the identifier allocated to the responding UE          530

In response to receiving the first sidelink discovery response comprising or associated with the at least one of the identifier of the initiating UE or the identifier allocated to the responding UE, generate and cause transmission of a second sidelink discovery response toward the initiating UE          540

FIG. 5

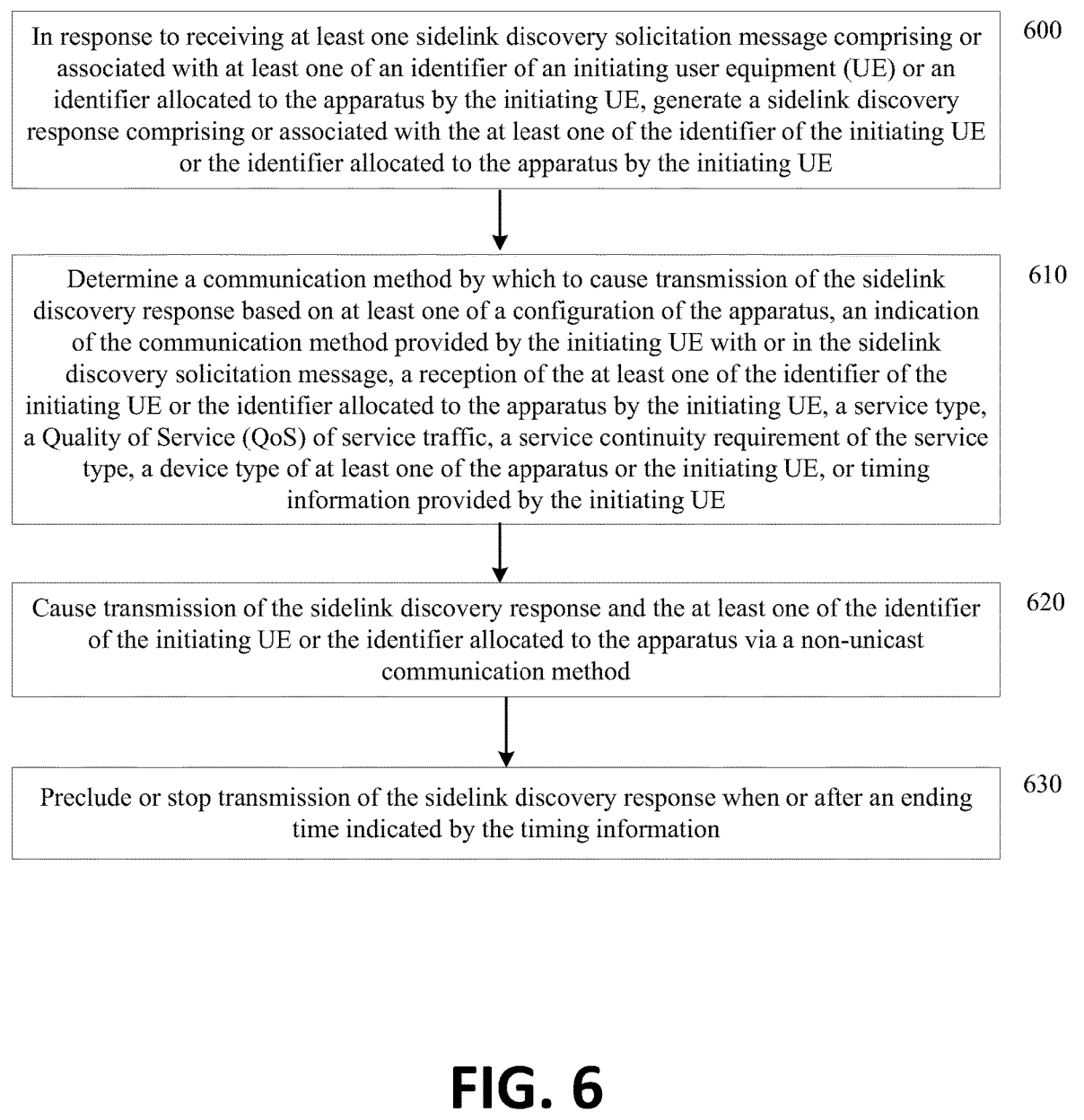

In response to receiving at least one sidelink discovery solicitation message comprising or associated with at least one of an identifier of an initiating user equipment (UE) or an identifier allocated to the apparatus by the initiating UE, generate a sidelink discovery response comprising or associated with the at least one of the identifier of the initiating UE or the identifier allocated to the apparatus by the initiating UE    600

Determine a communication method by which to cause transmission of the sidelink discovery response based on at least one of a configuration of the apparatus, an indication of the communication method provided by the initiating UE with or in the sidelink discovery solicitation message, a reception of the at least one of the identifier of the initiating UE or the identifier allocated to the apparatus by the initiating UE, a service type, a Quality of Service (QoS) of service traffic, a service continuity requirement of the service type, a device type of at least one of the apparatus or the initiating UE, or timing information provided by the initiating UE    610

Cause transmission of the sidelink discovery response and the at least one of the identifier of the initiating UE or the identifier allocated to the apparatus via a non-unicast communication method    620

Preclude or stop transmission of the sidelink discovery response when or after an ending time indicated by the timing information    630

FIG. 6

SIDELINK DISCOVERY WITH USER EQUIPMENT TO USER EQUIPMENT RELAY

TECHNOLOGICAL FIELD

Example embodiments relates generally to wireless communications and, more particularly, but not exclusively, to sidelink discovery with user equipment (UE) to UE (U2U) relay.

BACKGROUND

Sidelink (SL) communication enables devices to communicate with other devices without necessarily utilizing a radio access network (RAN) to establish communication with each other. Devices can create ad hoc networks with one another to gain access to a network or perform various other communication processes. Sidelink communication may provide improvements in latency, reliability, power consumption and/or the like, and may be utilized in a wide spectrum of applications relating to but not limited to gaming and virtual reality, industrial use cases, event monitoring, traffic information, public safety, and/or the like.

As described in 3rd Generation Partnership Project (3GPP) Technical Specification 23.304, sidelink discovery (SD) may be based on Model A or Model B. In Model A, a discoveree UE (also known as "announcing UE") proactively broadcasts an SD announcement periodically for a discoverer UE(s) (also known as "monitoring UE(s)") in proximity.

In Model B, a discoverer UE, upon a need of SD, broadcasts a SD solicitation over SL to discoveree UE(s) in proximity and monitors for SD response(s) from targeted discoveree UE(s) in response to its SD solicitation. The SD response from an individual discoveree UE to the discoverer UE may be sent in unicast. The SD messages in Model A and Model B are transmitted as SL data using resources from a configured resource pool (RP).

Model A may incur unnecessary signaling overhead due to the repeated broadcasts, and Model B may incur unnecessary signaling overhead due to potentially numerous unicast messages transmitted by each discoveree UE.

BRIEF SUMMARY

A method, apparatus, and computer program product are therefore disclosed for improved sidelink discovery using UE-to-UE (U2U) relay. In this regard, SD may include an indirect SD solicitation of UE1 (e.g., a discoverer UE, an initiating UE, or the UE seeking the sidelink connection) towards UE2 (e.g., a discoveree UE, a responding UE indicating availability for sidelink connection to UE1) via one or more relay UE candidates as indirect discovery.

The sidelink discovery accordingly to example embodiments is triggered and facilitated by UE1, which initiates an SD solicitation, such as at least partially according to Model B in 3GPP, for a SD of both UE2, and relay UE candidates to reach UE2. The UE2 in turn initiates an SD response, such as a broadcast announcement according to Model A in 3GPP, or via a multicast communication, toward relay UE candidates. The use of broadcast and/or multicast communication to transmit a response to a SD solicitation according to example embodiments, differs from the use of Model-B and/or unicast communication that is utilized in certain schemas such as the one defined in 3GPP TS 23.304 and described below with respect to FIG. 2.

An apparatus is provided, such as a UE2 or responding UE, comprising at least one processor and at least one memory including computer program code, the at least one memory and the computer program code configured to, with the processor, cause the apparatus to at least, in response to receiving at least one sidelink discovery solicitation message comprising or associated with at least one of an identifier of an initiating user equipment (UE) or an identifier allocated to the apparatus by the initiating UE, generate a sidelink discovery response comprising or associated with the at least one of the identifier of the initiating UE or the identifier allocated to the apparatus by the initiating UE, and cause transmission of the sidelink discovery response and the at least one of the identifier of the initiating UE or the identifier allocated to the apparatus via a non-unicast communication method.

The at least one of the identifier of an initiating UE or the identifier allocated to the apparatus is utilized as at least one of a source identifier or a destination identifier for transmitting the sidelink discovery response. The at least one sidelink discovery solicitation message is received from at least one relay UE. The sidelink discovery response may be caused to be transmitted via a broadcast communication method, such as a sidelink discovery announcement according to Model A defined by 3rd Generation Partnership Project (3GPP). Inc certain embodiments, the sidelink discovery response is caused to be transmitted via a multicast communication method.

The apparatus is configured to cause transmission of unicast sidelink discovery responses and non-unicast sidelink discovery responses. The at least one sidelink discovery solicitation message comprises or is associated with timing information, and the at least one memory and the computer program code are further configured to, with the processor, cause the apparatus to at least preclude or stop transmission of the sidelink discovery response when or after an ending time indicated by the timing information.

The at least one memory and the computer program code are further configured to, with the processor, cause the apparatus to at least determine a communication method by which to cause transmission of the sidelink discovery response based on at least one of a configuration of the apparatus, an indication of the communication method provided by the initiating UE with or in the sidelink discovery solicitation message, a reception of the at least one of the identifier of the initiating UE or the identifier allocated to the apparatus by the initiating UE, a service type, a Quality of Service (QoS) of service traffic, a service continuity requirement of the service type, a device type of at least one of the apparatus or the initiating UE, or timing information provided by the initiating UE.

The at least one of the identifier of the initiating UE or the identifier allocated to the apparatus is included in (a) the sidelink discovery response, (b) a sidelink medium access control (MAC) control element (CE) transmitted with the sidelink discovery response, or (c) sidelink control information transmitted with the sidelink discovery response.

The at least one memory and the computer program code are further configured to, with the processor, cause the apparatus to at least further cause transmission of, in or with the sidelink discovery response, a responding UE identifier of the apparatus.

Another apparatus is provided, such as a UE 1 or initiating UE, comprising at least one processor and at least one memory including computer program code, the at least one memory and the computer program code configured to, with the processor, cause the apparatus to at least generate a sidelink discovery solicitation message comprising or associated with at least one of an identifier of the apparatus or an identifier allocated to a responding user equipment (UE) by the apparatus, and cause transmission of the sidelink discovery solicitation message and the at least one of an identifier of the apparatus or an identifier allocated to the responding UE towards one or more relay UE candidates and the responding UE.

The at least one memory and the computer program code are further configured to, with the processor, cause the apparatus to at least further cause transmission of, in or with the sidelink discovery solicitation message, a discovery type indicator, indicating (a) direct discovery, (b) indirect discovery via one or more relay UE candidates, or (c) both indirect discovery and direct discovery. The at least one memory and the computer program code are further configured to, with the processor, cause the apparatus to at least further cause transmission of, in or with the sidelink discovery solicitation message, timing information indicating at least one of (a) a time for which at least one of the one or more relay UE candidates may transmit associated sidelink discovery solicitation messages to the responding UE and monitor for sidelink discovery responses, or (b) a time for which the responding UE may transmit a sidelink discovery response.

At least one of the identifier of the apparatus or the identifier allocated to the responding UE is included in (a) the sidelink discovery solicitation message, (b) a sidelink medium access control (MAC) control element (CE) transmitted with the sidelink discovery solicitation message, or (c) sidelink control information transmitted with the sidelink discovery solicitation message.

The identifier of the apparatus and the identifier allocated to the responding UE by the apparatus comprise layer 2 (L2) identifier, and the sidelink discovery solicitation message further comprises higher layer identifying information protected from the one or more relay UE candidates. The at least one memory and the computer program code are further configured to, with the processor, cause the apparatus to at least receive a sidelink discovery response from at least one of the one or more relay UE candidates.

Another apparatus is provided, such as a relay UE or relay UE candidate, comprising at least one processor and at least one memory including computer program code, the at least one memory and the computer program code configured to, with the processor, cause the apparatus to at least: in response to receiving, from an initiating user equipment (UE), a first sidelink discovery solicitation message comprising or associated with at least one of an identifier of the initiating UE or an identifier allocated to a responding UE by the initiating UE, determine whether to generate and transmit a second sidelink discovery solicitation message. In an instance it is determined to generate and transmit the second sidelink discovery solicitation message, the at least one memory and the computer program code configured to, with the processor, generate the second sidelink discovery solicitation message and cause transmission of the second sidelink discovery solicitation message and the at least one of the identifier of the initiating UE or the identifier allocated to a responding UE towards the responding UE, and monitor for a first sidelink discovery response from the responding UE, wherein the first sidelink discovery response comprises or is associated with the at least one of the identifier of the initiating UE or the identifier allocated to the responding UE.

The at least one memory and the computer program code are further configured to, with the processor, cause the apparatus to at least, in response to receiving the first sidelink discovery response comprising or associated with the at least one of the identifier of the initiating UE or the identifier allocated to the responding UE, generate and cause transmission of a second sidelink discovery response toward the initiating UE.

The monitoring for the first sidelink discovery response comprises monitoring for the first sidelink discovery response transmitted via a communication method comprising at least one of a multicast communication method or a broadcast communication method. The at least one memory and the computer program code are further configured to, with the processor, cause the apparatus to at least determine a communication method by which to monitor for the first sidelink discovery response based on at least one of a configuration of the apparatus, an indication of the communication method provided by the initiating UE with or in the sidelink discovery solicitation message, a reception of the at least one of the identifier of the initiating UE or the identifier allocated to the responding UE, a service type, a Quality of Service (QoS) of service traffic, a service continuity requirement of the service type, a device type of at least one of the initiating UE or the responding UE, or timing information provided by the initiating UE.

The at least one memory and the computer program code are further configured to, with the processor, cause the apparatus to at least, in an instance it is determined to not transmit the second sidelink discovery solicitation message, and a first sidelink discovery response is received corresponding to the second sidelink discovery solicitation not transmitted by the apparatus, determine whether to generate and cause transmission of the second sidelink discovery response to the initiating UE.

The at least one memory and the computer program code are further configured to, with the processor, cause the apparatus to at least, receive, in or with the sidelink discovery solicitation message, timing information indicating at least one of (a) a time for which the apparatus may transmit associated sidelink discovery solicitation messages to the responding UE and monitor for sidelink discovery responses, or (b) a time for which the responding UE may transmit a sidelink discovery response.

A method is provided, which may be performed by a UE2 or responding UE, the method comprising, in response to receiving at least one sidelink discovery solicitation message comprising or associated with at least one of an identifier of an initiating user equipment (UE) or an identifier allocated to the responding UE by the initiating UE, generating a sidelink discovery response comprising or associated with the at least one of the identifier of the initiating UE or the identifier allocated to the responding UE by the initiating UE, and causing transmission of the sidelink discovery response and the at least one of the identifier of the initiating UE or the identifier allocated to the responding UE via a non-unicast communication method.

The at least one of the identifier of an initiating UE or the identifier allocated to the responding UE is utilized as at least one of a source identifier or a destination identifier for transmitting the sidelink discovery response. The at least one sidelink discovery solicitation message is received from at least one relay UE. The sidelink discovery response may be caused to be transmitted via a broadcast communication method, such as via a sidelink discovery announcement according to Model A defined by 3rd Generation Partnership Project (3GPP). In certain embodiments, the sidelink discovery response is caused to be transmitted via a multicast communication method. The method is configured to cause transmission of unicast sidelink discovery responses and non-unicast sidelink discovery responses.

The at least one sidelink discovery solicitation message comprises or is associated with timing information, and the method further includes causing the responding UE to at least preclude or stop transmission of the sidelink discovery response when or after an ending time indicated by the timing information.

The method may further include determining a communication method by which to cause transmission of the sidelink discovery response based on at least one of a configuration of the responding UE, an indication of the communication method provided by the initiating UE with or in the sidelink discovery solicitation message, a reception of the at least one of the identifier of the initiating UE or the identifier allocated to the responding UE by the initiating UE, a service type, a Quality of Service (QoS) of service traffic, a service continuity requirement of the service type, a device type of at least one of the responding UE or the initiating UE, or timing information provided by the initiating UE.

The at least one of the identifier of the initiating UE or the identifier allocated to the responding UE is included in (a) the sidelink discovery response, (b) a sidelink medium access control (MAC) control element (CE) transmitted with the sidelink discovery response, or (c) sidelink control information transmitted with the sidelink discovery response. The method may further include causing transmission of, in or with the sidelink discovery response, a responding UE identifier of the responding UE.

Another method is provided, that may be performed by a UE1 or initiating UE, the method including generating a sidelink discovery solicitation message comprising or associated with at least one of an identifier of the responding UE or an identifier allocated to a responding user equipment (UE) by the responding UE, and causing transmission of the sidelink discovery solicitation message and the at least one of an identifier of the initiating UE or an identifier allocated to the responding UE towards one or more relay UE candidates and the responding UE.

The method includes causing transmission of, in or with the sidelink discovery solicitation message, a discovery type indicator, indicating (a) direct discovery, (b) indirect discovery via one or more relay UE candidates, or (c) both indirect discovery and direct discovery.

The method further includes causing transmission of, in or with the sidelink discovery solicitation message, timing information indicating at least one of (a) a time for which at least one of the one or more relay UE candidates may transmit associated sidelink discovery solicitation messages to the responding UE and monitor for sidelink discovery responses, or (b) a time for which the responding UE may transmit a sidelink discovery response.

The at least one of the identifier of the initiating UE or the identifier allocated to the responding UE is included in (a) the sidelink discovery solicitation message, (b) a sidelink medium access control (MAC) control element (CE) transmitted with the sidelink discovery solicitation message, or (c) sidelink control information transmitted with the sidelink discovery solicitation message.

The identifier of the initiating UE and the identifier allocated to the responding UE by the initiating UE comprise layer 2 (L2) identifier, and the sidelink discovery solicitation message further comprises higher layer identifying information protected from the one or more relay UE candidates. The method may further include receiving a sidelink discovery response from at least one of the one or more relay UE candidates.

Another method is provided, that may be performed by a relay UE and/or relay UE candidate, the method including, in response to receiving, from an initiating user equipment (UE), a first sidelink discovery solicitation message comprising or associated with at least one of an identifier of the initiating UE or an identifier allocated to a responding UE by the initiating UE, determine whether to generate and transmit a second sidelink discovery solicitation message. The method further includes, in an instance it is determined to generate and transmit the second sidelink discovery solicitation message, generate the second sidelink discovery solicitation message and cause transmission of the second sidelink discovery solicitation message and the at least one of the identifier of the initiating UE or the identifier allocated to a responding UE towards the responding UE. The method further includes monitoring for a first sidelink discovery response from the responding UE, wherein the first sidelink discovery response comprises or is associated with the at least one of the identifier of the initiating UE or the identifier allocated to the responding UE.

The method further includes, in response to receiving the first sidelink discovery response comprising or associated with the at least one of the identifier of the initiating UE or the identifier allocated to the responding UE, generating and causing transmission of a second sidelink discovery response toward the initiating UE.

The monitoring for the first sidelink discovery response comprises monitoring for the first sidelink discovery response transmitted via a communication method comprising at least one of a multicast communication method or a broadcast communication method. The method may further include determining a communication method by which to monitor for the first sidelink discovery response based on at least one of a configuration of the relay UE, an indication of the communication method provided by the initiating UE with or in the sidelink discovery solicitation message, a reception of the at least one of the identifier of the initiating UE or the identifier allocated to the responding UE, a service type, a Quality of Service (QoS) of service traffic, a service continuity requirement of the service type, a device type of at least one of the initiating UE or the responding UE, or timing information provided by the initiating UE.

The method further includes, in an instance it is determined to not transmit the second sidelink discovery solicitation message, and a first sidelink discovery response is received corresponding to the second sidelink discovery solicitation not transmitted by the UE relay, determining whether to generate and cause transmission of the second sidelink discovery response to the initiating UE.

The method further includes receiving, in or with the sidelink discovery solicitation message, timing information indicating at least one of (a) a time for which the relay UE may transmit associated sidelink discovery solicitation messages to the responding UE and monitor for sidelink discovery responses, or (b) a time for which the responding UE may transmit a sidelink discovery response.

An computer program product is provided, such as may be implemented on a UE2 or responding UE, the computer program product comprising at least one non-transitory computer-readable storage medium having computer-executable program code instructions stored therein, the computer-executable program code instructions comprising program code instructions to, in response to receiving at least one sidelink discovery solicitation message comprising or associated with at least one of an identifier of an initiating user equipment (UE) or an identifier allocated to the responding UE by the initiating UE, generate a sidelink discovery response comprising or associated with the at least one of the identifier of the initiating UE or the identifier allocated to the responding UE by the initiating UE, and cause transmission of the sidelink discovery response and the at least one of the identifier of the initiating UE or the identifier allocated to the responding UE via a non-unicast communication method.

The computer-executable program code instructions further include program code instructions to cause transmission of unicast sidelink discovery responses and non-unicast sidelink discovery responses. The at least one sidelink discovery solicitation message comprises or is associated with timing information, and the computer-executable program code instructions further include program code instructions to cause the responding UE to at least preclude or stop transmission of the sidelink discovery response when or after an ending time indicated by the timing information.

The computer-executable program code instructions further include program code instructions to cause the responding UE or UE2 to at least determine a communication method by which to cause transmission of the sidelink discovery response based on at least one of a configuration of the responding UE, an indication of the communication method provided by the initiating UE with or in the sidelink discovery solicitation message, a reception of the at least one of the identifier of the initiating UE or the identifier allocated to the responding UE by the initiating UE, a service type, a Quality of Service (QoS) of service traffic, a service continuity requirement of the service type, a device type of at least one of the responding UE or the initiating UE, or timing information provided by the initiating UE.

The computer-executable program code instructions further include program code instructions to cause transmission of, in or with the sidelink discovery response, a responding UE identifier of the responding UE.

Another computer program product is provided, such as on implemented on UE 1 or initiating UE, the computer program product comprising at least one non-transitory computer-readable storage medium having computer-executable program code instructions stored therein, the computer-executable program code instructions comprising program code instructions to generate a sidelink discovery solicitation message comprising or associated with at least one of an identifier of the initiating UE or an identifier allocated to a responding user equipment (UE) by the initiating UE, and cause transmission of the sidelink discovery solicitation message and the at least one of an identifier of the initiating UE or an identifier allocated to the responding UE towards one or more relay UE candidates and the responding UE.

The computer-executable program code instructions further include program code instructions to cause transmission of, in or with the sidelink discovery solicitation message, a discovery type indicator, indicating (a) direct discovery, (b) indirect discovery via one or more relay UE candidates, or (c) both indirect discovery and direct discovery. The computer-executable program code instructions further include program code instructions to at least further cause transmission of, in or with the sidelink discovery solicitation message, timing information indicating at least one of (a) a time for which at least one of the one or more relay UE candidates may transmit associated sidelink discovery solicitation messages to the responding UE and monitor for sidelink discovery responses, or (b) a time for which the responding UE may transmit a sidelink discovery response.

At least one of the identifier of the initiating UE or the identifier allocated to the responding UE is included in (a) the sidelink discovery solicitation message, (b) a sidelink medium access control (MAC) control element (CE) transmitted with the sidelink discovery solicitation message, or (c) sidelink control information transmitted with the sidelink discovery solicitation message.

The identifier of the initiating UE and/or the identifier allocated to the responding UE comprise layer 2 (L2) identifier, and the sidelink discovery solicitation message further comprises higher layer identifying information protected from the one or more relay UE candidates. The computer-executable program code instructions further include program code instructions to at least receive a sidelink discovery response from at least one of the one or more relay UE candidates.

Another computer program product is provided, such as may be implemented on relay UE or relay UE candidate, the computer program product comprising at least one non-transitory computer-readable storage medium having computer-executable program code instructions stored therein, the computer-executable program code instructions comprising program code instructions to in response to receiving, from an initiating user equipment (UE), a first sidelink discovery solicitation message comprising or associated with at least one of an identifier of the initiating UE or an identifier allocated to a responding UE by the initiating UE, determine whether to generate and transmit a second sidelink discovery solicitation message. In an instance it is determined to generate and transmit the second sidelink discovery solicitation message, the computer-executable program code instructions further include program code instructions to generate the second sidelink discovery solicitation message and cause transmission of the second sidelink discovery solicitation message and the at least one of the identifier of the initiating UE or the identifier allocated to a responding UE towards the responding UE, and monitor for a first sidelink discovery response from the responding UE, wherein the first sidelink discovery response comprises or is associated with the at least one of the identifier of the initiating UE or the identifier allocated to the responding UE.

The computer-executable program code instructions further include program code instructions to, in response to receiving the first sidelink discovery response comprising or associated with the at least one of the identifier of the initiating UE or the identifier allocated to the responding UE, generate and cause transmission of a second sidelink discovery response toward the initiating UE.

The monitoring for the first sidelink discovery response comprises monitoring for the first sidelink discovery response transmitted via a communication method comprising at least one of a multicast communication method or a broadcast communication method. The computer-executable program code instructions further include program code instructions to at least determine a communication method by which to monitor for the first sidelink discovery response based on at least one of a configuration of the relay UE, an indication of the communication method provided by the initiating UE with or in the sidelink discovery solicitation message, a reception of the at least one of the identifier of the initiating UE or the identifier allocated to the responding UE, a service type, a Quality of Service (QoS) of service traffic, a service continuity requirement of the service type, a device type of at least one of the initiating UE or the responding UE, or timing information provided by the initiating UE.

The computer-executable program code instructions further include program code instructions to at least, in an instance it is determined to not transmit the second sidelink discovery solicitation message, and a first sidelink discovery response is received corresponding to the second sidelink discovery solicitation not transmitted by the relay UE, determine whether to generate and cause transmission of the second sidelink discovery response to the initiating UE.

The computer-executable program code instructions further include program code instructions to at least, receive, in or with the sidelink discovery solicitation message, timing information indicating at least one of (a) a time for which the relay UE may transmit associated sidelink discovery solicitation messages to the responding UE and monitor for sidelink discovery responses, or (b) a time for which the responding UE may transmit a sidelink discovery response.

An apparatus is provided, such as a UE2 or responding UE, the apparatus comprising means for, in response to receiving at least one sidelink discovery solicitation message comprising or associated with at least one of an identifier of an initiating user equipment (UE) or an identifier allocated to the responding UE by the initiating UE, generating a sidelink discovery response comprising or associated with the at least one of the identifier of the initiating UE or the identifier allocated to the responding UE by the initiating UE, and causing transmission of the sidelink discovery response and the at least one of the identifier of the initiating UE or the identifier allocated to the responding UE via a non-unicast communication method.

The at least one of the identifier of an initiating UE or the identifier allocated to the responding UE is utilized as at least one of a source identifier or a destination identifier for transmitting the sidelink discovery response. The at least one sidelink discovery solicitation message is received from at least one relay UE. The sidelink discovery response may be caused to be transmitted via a broadcast communication method, such as via a sidelink discovery announcement according to Model A defined by 3rd Generation Partnership Project (3GPP). In certain embodiments, the sidelink discovery response is caused to be transmitted via a multicast communication method. The apparatus further includes means for causing transmission of unicast sidelink discovery responses and non-unicast sidelink discovery responses.

The at least one sidelink discovery solicitation message comprises or is associated with timing information, and the apparatus further includes means for causing the responding UE to at least preclude or stop transmission of the sidelink discovery response when or after an ending time indicated by the timing information.

The apparatus may further include means for determining a communication method by which to cause transmission of the sidelink discovery response based on at least one of a configuration of the responding UE, an indication of the communication method provided by the initiating UE with or in the sidelink discovery solicitation message, a reception of the at least one of the identifier of the initiating UE or the identifier allocated to the responding UE by the initiating UE, a service type, a Quality of Service (QoS) of service traffic, a service continuity requirement of the service type, a device type of at least one of the responding UE or the initiating UE, or timing information provided by the initiating UE.

The at least one of the identifier of the initiating UE or the identifier allocated to the responding UE is included in (a)

the sidelink discovery response, (b) a sidelink medium access control (MAC) control element (CE) transmitted with the sidelink discovery response, or (c) sidelink control information transmitted with the sidelink discovery response. The apparatus may further include means for causing transmission of, in or with the sidelink discovery response, a responding UE identifier of the responding UE.

Another apparatus is provided, such as a UE1 or initiating UE, the apparatus including means for generating a sidelink discovery solicitation message comprising or associated with at least one of an identifier of the responding UE or an identifier allocated to a responding user equipment (UE) by the responding UE, and causing transmission of the sidelink discovery solicitation message and the at least one of an identifier of the initiating UE or an identifier allocated to the responding UE towards one or more relay UE candidates and the responding UE.

The apparatus further includes means for causing transmission of, in or with the sidelink discovery solicitation message, a discovery type indicator, indicating (a) direct discovery, (b) indirect discovery via one or more relay UE candidates, or (c) both indirect discovery and direct discovery.

The apparatus further includes means for causing transmission of, in or with the sidelink discovery solicitation message, timing information indicating at least one of (a) a time for which at least one of the one or more relay UE candidates may transmit associated sidelink discovery solicitation messages to the responding UE and monitor for sidelink discovery responses, or (b) a time for which the responding UE may transmit a sidelink discovery response.

The at least one of the identifier of the initiating UE or the identifier allocated to the responding UE is included in (a) the sidelink discovery solicitation message, (b) a sidelink medium access control (MAC) control element (CE) transmitted with the sidelink discovery solicitation message, or (c) sidelink control information transmitted with the sidelink discovery solicitation message.

The identifier of the initiating UE and the identifier allocated to the responding UE by the initiating UE comprise layer 2 (L2) identifier, and the sidelink discovery solicitation message further comprises higher layer identifying information protected from the one or more relay UE candidates. The apparatus may further include means for receiving a sidelink discovery response from at least one of the one or more relay UE candidates.

Another apparatus is provided, such as a relay UE and/or relay UE candidate, the apparatus including means for, in response to receiving, from an initiating user equipment (UE), a first sidelink discovery solicitation message comprising or associated with at least one of an identifier of the initiating UE or an identifier allocated to a responding UE by the initiating UE, determine whether to generate and transmit a second sidelink discovery solicitation message. The apparatus further includes, in an instance it is determined to generate and transmit the second sidelink discovery solicitation message, means for generating the second sidelink discovery solicitation message and cause transmission of the second sidelink discovery solicitation message and the at least one of the identifier of the initiating UE or the identifier allocated to a responding UE towards the responding UE. The apparatus further includes means for monitoring for a first sidelink discovery response from the responding UE, wherein the first sidelink discovery response comprises or is associated with the at least one of the identifier of the initiating UE or the identifier allocated to the responding UE.

The apparatus further includes means for, in response to receiving the first sidelink discovery response comprising or associated with the at least one of the identifier of the initiating UE or the identifier allocated to the responding UE, generating and causing transmission of a second sidelink discovery response toward the initiating UE.

The monitoring for the first sidelink discovery response comprises monitoring for the first sidelink discovery response transmitted via a communication method comprising at least one of a multicast communication method or a broadcast communication method. The apparatus may further include means for determining a communication method by which to monitor for the first sidelink discovery response based on at least one of a configuration of the relay UE, an indication of the communication method provided by the initiating UE with or in the sidelink discovery solicitation message, a reception of the at least one of the identifier of the initiating UE or the identifier allocated to the responding UE, a service type, a Quality of Service (QoS) of service traffic, a service continuity requirement of the service type, a device type of at least one of the initiating UE or the responding UE, or timing information provided by the initiating UE.

The apparatus further includes means for, in an instance it is determined to not transmit the second sidelink discovery solicitation message, and a first sidelink discovery response is received corresponding to the second sidelink discovery solicitation not transmitted by the UE relay, determining whether to generate and cause transmission of the second sidelink discovery response to the initiating UE.

The apparatus further includes means for receiving, in or with the sidelink discovery solicitation message, timing information indicating at least one of (a) a time for which the relay UE may transmit associated sidelink discovery solicitation messages to the responding UE and monitor for sidelink discovery responses, or (b) a time for which the responding UE may transmit a sidelink discovery response.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Figure 1:
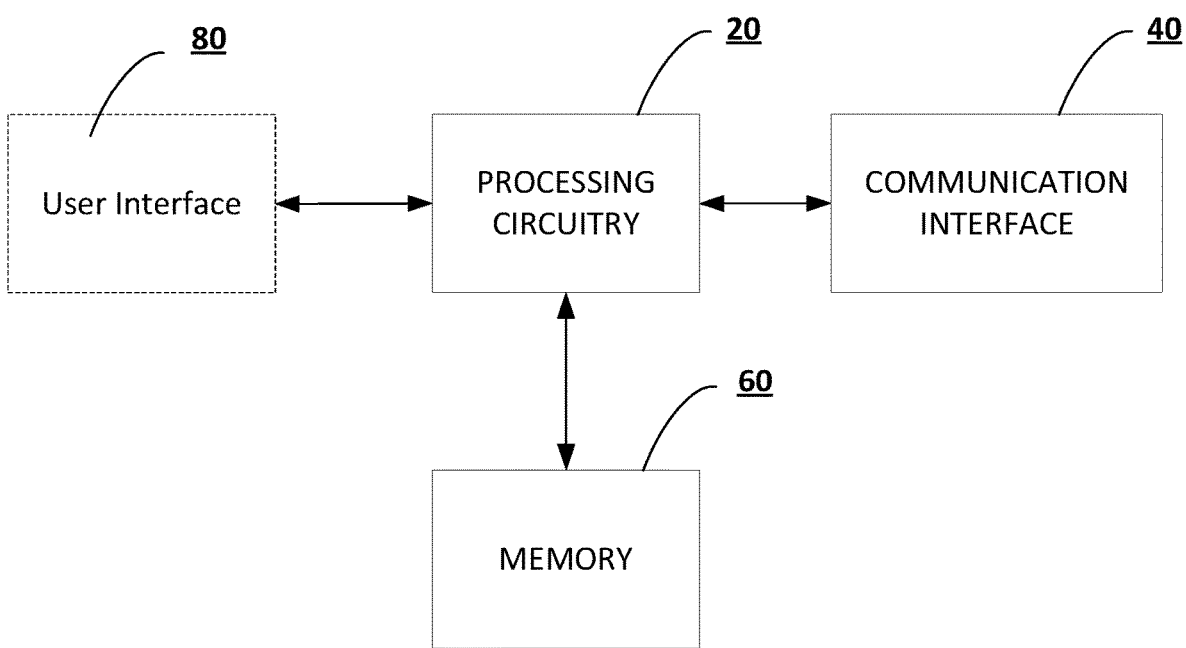
Figure 2:
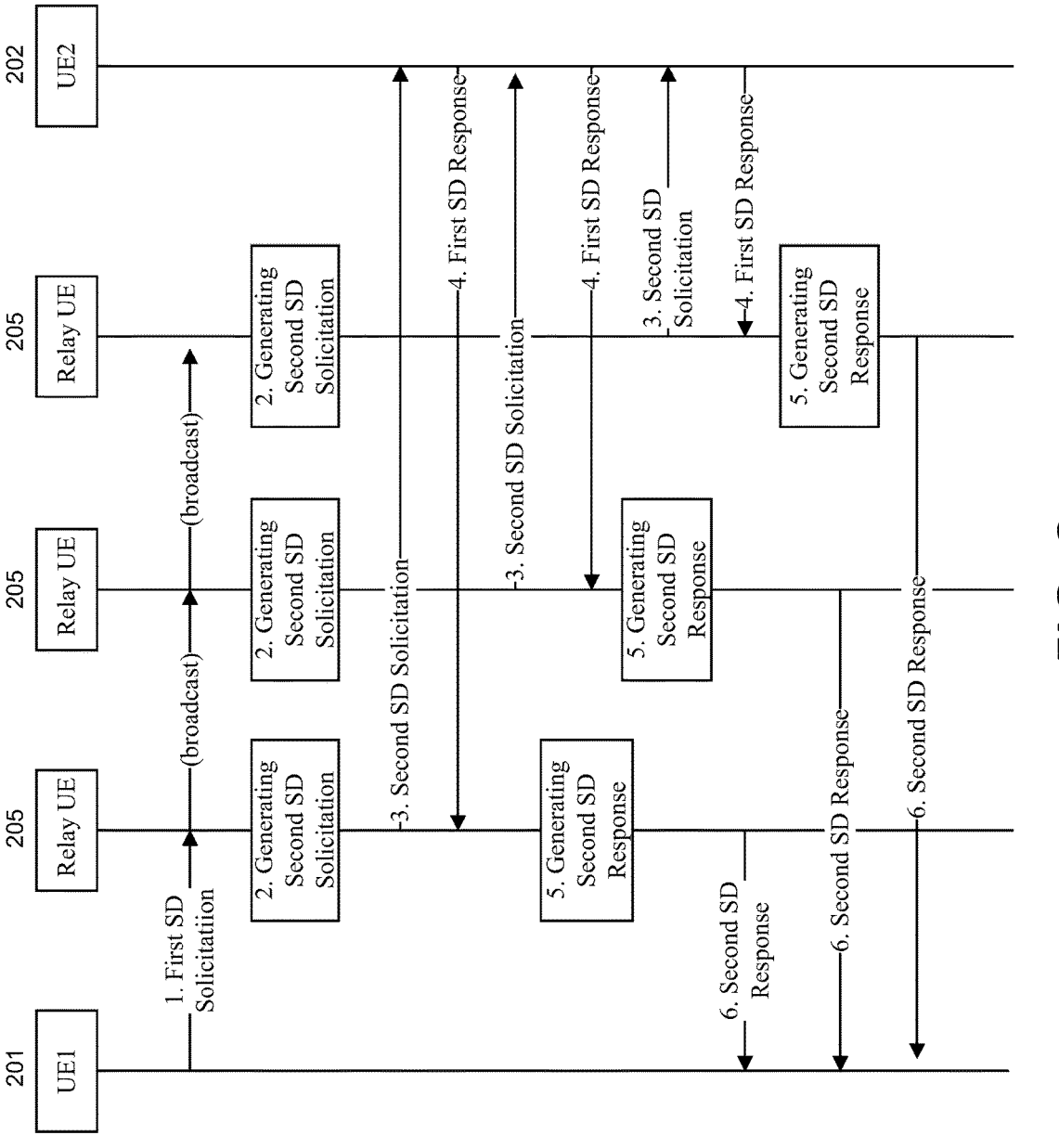
Figure 3:
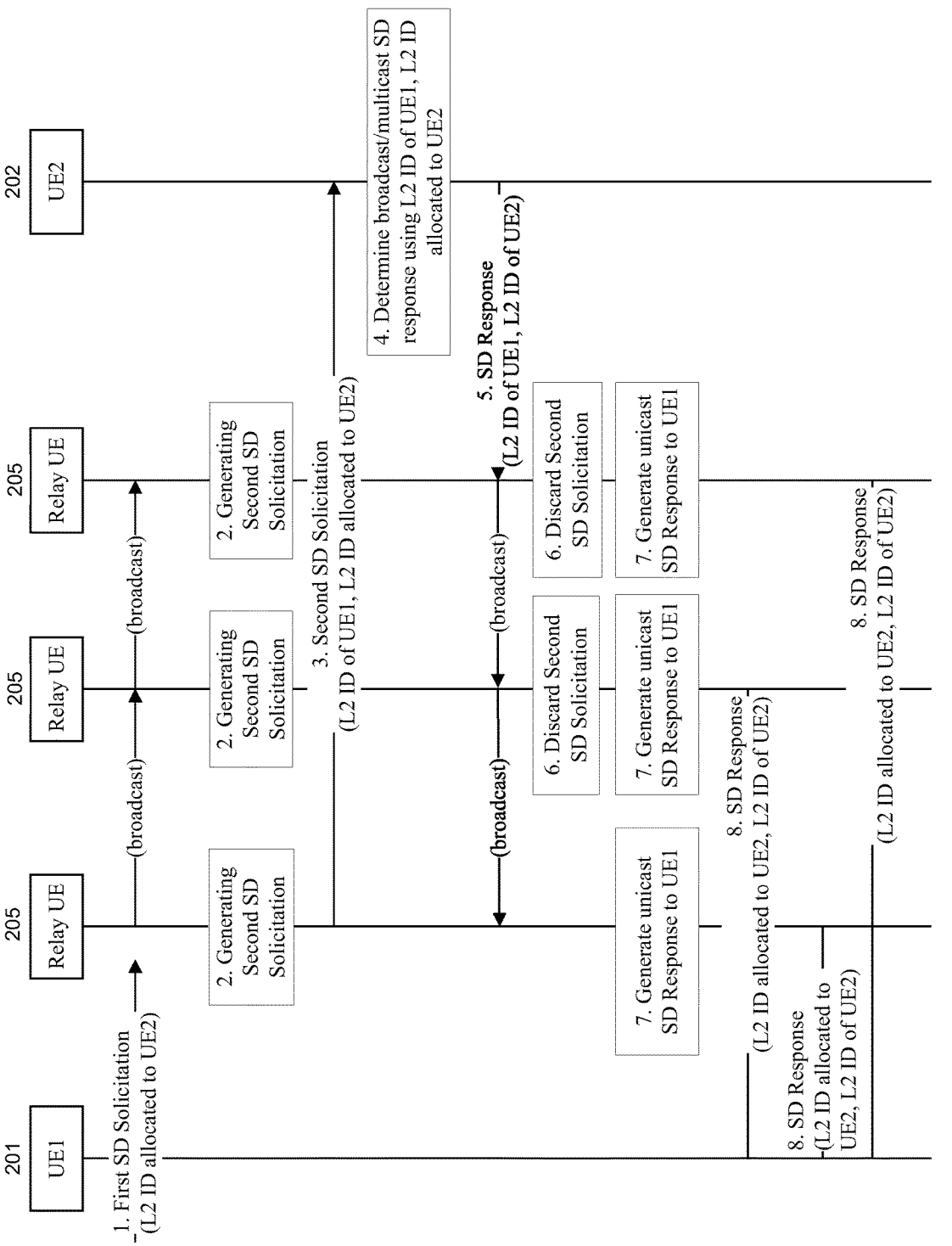

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with certain example embodiments;

FIG. 2 is a data flow schematic according to 3GPP;

FIG. 3 is a data flow schematic according to certain example embodiments;

FIG. 4 is a flowchart of operations that may be performed by UE1 (an initiating UE) according to certain example embodiments;

FIG. 5 is a flowchart of operations that may be performed by a relay UE or relay UE candidate, according to certain example embodiments; and FIG. 6 is a flowchart of operations that may be performed by UE2 (a responding UE), according to certain example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Apparatus 100 of FIG. 1 is one example of an apparatus that may be configured as a UE according to example embodiments provided herein, including but not limited to a UE1, UE relay candidate, and/or UE2. As shown in FIG. 1, the apparatus 100 includes, is associated with or is in communication with processing circuitry 20, a memory 60, a communication interface 40, and an optional user interface 80. The processing circuitry 20 may be in communication with the memory device via a bus for passing information among components of the apparatus 100. The memory device 60 may be non-transitory and may include, for example, one or more volatile and/or non-volatile memories. In other words, for example, the memory device 60 may be an electronic storage device (e.g., a computer readable storage medium) comprising gates configured to store data (e.g., bits) that may be retrievable by a machine (e.g., a computing device like the processing circuitry). The memory device 60 may be configured to store information, data, content, applications, instructions, or the like for enabling the apparatus to carry out various functions in accordance with an example embodiment of the present disclosure. For example, the memory device 60 could be configured to buffer input data for processing by the processing circuitry 20. Additionally or alternatively, the memory device 60 could be configured to store instructions for execution by the processing circuitry 20.

The apparatus 100 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 20 may be embodied in a number of different ways. For example, the processing circuitry 20 may be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Microcontroller Unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 20 may be configured to execute instructions stored in the memory device 60 or otherwise accessible to the processing circuitry 20. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 20 is embodied as an executor of instructions, the instructions may specifically configure the processor to perform the algorithms and/or operations described herein when the instructions are executed. However, in some cases, the processing circuitry 20 may be a processor of a specific device configured to employ an embodiment of the present invention by further configuration of the processing circuitry by instructions for performing the algorithms and/or operations described herein. The processing circuitry 20 may include, among other things, a clock, an Arithmetic Logic Unit (ALU) and logic gates configured to support operation of the processing circuitry.

The communication interface 40 may be any means such as a device or circuitry embodied in either hardware or a combination of hardware and software that is configured to receive and/or transmit data, including media content in the form of video or image files, one or more audio tracks or the like. In this regard, the communication interface 40 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, Digital Subscriber Line (DSL), Universal Serial Bus (USB) or other mechanisms.

The user interface 80, which may be optional in certain embodiments, may be in communication with the processing circuitry 20 to receive an indication of a user input at the user interface 80 and/or to provide an audible, visual, mechanical, or other output to the user. As such, the user interface 80 may include, for example, a keyboard, a mouse, a display, a touch screen display, a microphone, a speaker, and/or other input/output mechanisms.

Having now described an apparatus 100 used to implement any of the UE1, U2U relay devices, and/or UE2, FIG. 2 is a data flow schematic illustrating SD with U2U relay using Model B, according to 3GPP TS 23.304. The data flow considers an example case in which a discoverer UE1 (201) wants to discover a discoveree UE2 (202) as well as relay UE (205) candidates which can help UE1 to reach UE2 after UE1 detects that UE2 can't be reached directly over SL.

A relay UE (205) candidate referenced herein may be considered a relay UE, U2U relay UE, U2U relay UE candidate, and such terms may be used interchangeably. UE1 201 may be referenced herein as a discoverer UE, an initiating UE, a source (SRC) UE, and the terms may be used interchangeably. UE2 202 may be referenced herein as a discoveree UE, a responding UE, a destination (DST) UE, and the terms may also be used interchangeably.

In certain configurations, it may be advantageous for UE1 and/or UE2 to not announce themselves for SD using Model A because of power and resource efficiency reasons. Thus, UE1 on an as-need basis may initiate a SD solicitation in Model B to request any available relay UE in proximity to discover UE2 and respond to UE1 in case it is able to reach or discover UE2.

According to FIG. 2, each individual relay UE, upon receiving the SD solicitation from UE1 (operation 1), may further generate a second SD solicitation (operation 2) using discovery Model B and transmit the second SD solicitation (operation 3) toward UE2 (202). UE2, upon receiving the SD solicitation from the individual relay UE may respond to the individual relay UE. The individual relay UE in turn may respond to UE1 and become a relay UE candidate for UE1. It can be observed in FIG. 2 that the higher number of relay UE (205) candidates, the higher the signaling overhead and latency are for the overall SD with U2U relay for generating (operation 5) and transmitting (operation 6) second SD responses, and especially UE2 due to independent SD procedures performed between individual relay UE candidates and UE2 (operation 4).

Example embodiments provided herein reduce the signaling overhead and latency issues observed with respect to FIG. 2, as described in further detail herein. FIG. 3 is an example data flow schematic for an indirect SD via U2U relay between UE1 and UE2 which can be used for autonomously setting up a UE-to-UE connection between UE1 and UE2 via U2U relay, according to example embodiments.

According to example embodiments, UE1 (the initiating UE), upon a need for SD of both UE2 and relay UE candidates to reach UE2, initiates a first SD solicitation (operation 1 of FIG. 3) towards relay UE candidates in proximity. The first SD solicitation may include a L2 ID allocated for UE2 by UE1, and/or an identifier of UE1 such as L2 ID of UE1. The allocated L2 ID is for UE2, or the L2 ID of UE1, is used as a temporary SRC ID for UE2 transmitting a response, as determined by UE2 upon receiving at least one SD solicitation, referred to as the second SD solicitation, from at least one relay UE candidate. The L2 ID allocated for UE2 is also used for relay UE candidates to identify UE2, as detailed further below with respect to operation 5 of FIG. 3.

The first SD solicitation may also include indicators of a communication method type, such as an indicator that enables/disables the use of SD broadcast announcement and/or multicasting (also referred to as groupcasting) an SD response by UE2.

It is noted that the first SD solicitation may further include other higher-layer ID of UE1 and UE2 which may be protected from relay UE candidates, an indication indicative of that the SD solicitation is for SD of both relay UE candidates and UE2, etc.

Relay UE candidates, upon receiving the first SD solicitation from UE1, each respectively perform, generating the second SD solicitation (operation 2 of FIG. 3), broadcasting the second SD solicitation towards UE2 (operation 3), monitoring for a response from UE 2 (operation 5), and determining whether to discard (operation 6) the second SD solicitation occurring at operation 2.

The second SD solicitation, generated in operation 2 of FIG. 3 and transmitted in operation 3, may include indicators of the communication method type to be used by UE2 (e.g., broadcast or multicast). The second SD solicitation may include the L2 ID of UE1 in addition to information provided in the first SD solicitation received from UE1, such as but not limited to the L2 ID allocated to UE2.

UE2, in operation 5 of FIG. 3 and upon receiving at least one second SD solicitation from at least one relay UE candidate, determines to respond to the at least one relay UE candidate by broadcasting the SD announcement in Model A or multicasting the SD response in Model B. The actual L2 ID of UE2 may be included in the SD announcement in Model A or the SD response in Model B from UE2. UE2 may also consider the indicators that enable/disable the use of SD announcement (broadcast) of Model A and/or multicasting SD response of Model B received in the second SD solicitation. Furthermore, the indicators may also imply or specify whether UE1 or UE2 may be in charge of relay UE selection. For example, UE1 may delegate the relay UE selection to UE2 by disabling the use of broadcasting and/or multicasting above.

Operation 5 of FIG. 3 may therefore include initiating a SD announcement in Model A or to use SL multicast for sending SD response to relay UE candidates in response to at least one SD solicitation received from at least one relay UE candidate by UE2, instead of the conventional Model-B based operation as illustrated above in FIG. 2.

The Relay UE candidates monitor for the response from UE2 via the communication method type indicated by the UE1 or configured at the relay UE, such as a non-unicast communication method type including but not limited to broadcast and/or multicast.

When monitoring for a possible broadcast SD announcement from UE2, the relay UE monitors for a response in which the L2 SRC ID of the SD announcement from UE2 matches the allocated L2 ID for UE2 in the first SD solicitation and/or a response that includes the L2 ID of UE1 for example. In certain embodiments, monitoring for broadcasted responses is only performed if the use of SD broadcast announcement of Model A is not disabled by an indicator in the first SD solicitation.

When monitoring for possible multicast SD response from UE2, the relay UE monitors for a response in which the L2 SRC ID of the SD response from UE2 is identical to the allocated L2 ID for UE2 in the first SD solicitation and that the L2 DST ID of the SD response from UE2 is identical to the L2 ID of UE1 for example. In certain embodiments, the monitoring for multicast response is only performed if the use of multicasting SD response of Model B by UE2 is not disabled by an indicator in the first SD solicitation.

The relay UE may skip or stop the transmission of the second SD solicitation message in case individual relay UE candidates receive either the broadcast SD announcement or the multicast SD response from UE2 before or after actual transmission of the second SD solicitation, as different relay UE candidates may select resources in different time instances or slots for transmitting the second SD solicitation.

In operations 7 and 8 of FIG. 3, a relay UE candidate, in response to receiving the SD response from UE2, generates and transmits a unicast response to UE1.

The use of the L2 IDs (e.g., of UE1 and identifier allocated to UE2) may be considered optional, but the use of the L2 IDs provides: (i) higher-layer contents of the SD solicitation to be transparent to or protected from relay UE candidates; and/or (ii) the access stratum at relay UE candidates to assist in identifying UE1 and UE2 and making a decision, in transmitting and monitoring SD messages related to the ongoing SD process initiated by UE1, faster and more efficient.

It will be appreciated that in certain embodiments, multicast may be used by UE 2 to transmit the response only if at least the identifier of UE1 is provided, or both the identifier of the UE1 and the identifier allocated to UE2 are provided. If the identifier of UE1 is not provided, broadcast communication may be used by UE2 to transmit the SD response.

Referring now to FIG. 4, an example flowchart of operations that may be performed by apparatus 100, such as UE1, is provided. As shown by operation 400 of FIG. 2, apparatus 100, such as UE1, includes means, such as processing circuitry 20, memory 60, and/or the like, for generating a SD solicitation message comprising or associated with at least one of an identifier of the apparatus or an identifier allocated to a responding user equipment (UE) such as UE2 by the apparatus (UE1). In this regard, the at least one of the identifier of the apparatus (UE1) or the identifier allocated to the responding UE (UE2) is included in (a) the SD solicitation message, (b) a sidelink medium access control (MAC) control element (CE) transmitted with the SD solicitation message, or (c) sidelink control information transmitted with the SD solicitation message.

The identifier of the apparatus and the identifier allocated to the responding UE by the apparatus may be configured as layer 2 (L2) identifier (L2 ID). The SD solicitation message may include higher layer identifying information protected from the one or more relay UE candidates.

Additionally or alternatively, in certain embodiments, if UE1 is aware of the current L2 ID of UE2 based on recent communications between UE1 and UE2, UE1 may set the allocated L2 ID for UE2 in the first SD solicitation to the current L2 ID of UE2.

Some information transmitted in or with the SD solicitation message may be considered optional, such as the data discussed with respect to operations 410 and 420 below.

As shown by operation 410, apparatus 100, such as UE1, includes means, such as processing circuitry 20, memory 60, and/or the like, for optionally including in or with the SD solicitation message, a discovery type indicator, indicating (a) direct discovery, (b) indirect discovery via one or more relay UE candidates, or (c) both indirect discovery and direct discovery. In this regard, direct discovery indicates a relay UE is not to be utilized, and therefore any recipient relay UE would not further transmit a solicitation. Indirect discovery indicates a relay UE is to be used or may be used to transmit solicitations toward a responding UE (UE2). According to example embodiments, an indication to use both indirect and direct discovery indicates that either or both a recipient UE candidate and/or responding UE may respond to the solicitation. In certain example embodiments, indirect discovery only may be used (e.g., and direct discovery omitted), such as in a scenario which UE1 is aware of that it is far away enough from UE2 and even if UE1 might be able to reach UE2 directly UE1 preferred to find U2U relays to reach UE2, for power efficiency reasons, for example.

In certain embodiments, a discovery type indication can be sent on a non-access stratum (NAS) level, e.g., included in the discovery solicitation message. As another example, the indication can be sent on an access stratum (AS) level, as low as in L1 sidelink control information (SCI) that is used for scheduling the transmission of the discovery solicitation message.

As shown by operation 420, apparatus 100, such as UE1, includes means, such as processing circuitry 20, memory 60, and/or the like, for optionally including in or with the SD solicitation message, timing information indicating at least one of (a) a time for which at least one of the one or more relay UE candidates may transmit associated SD solicitation messages to the responding UE and monitor for SD responses, or (b) a time for which the responding UE may transmit a SD response. The relay UE candidate and/or responding UE may utilize the timing information as described in further detail below, such as for determining a communication method by which to transmit related messages, and/or as an indication of when to cease transmission of related messages.

In certain embodiments, UE1 may set an ending time for the requested SD in the SD solicitation to both relay UE candidates and UE2. This can be given with, e.g., a given SL system frame number (SFN). UE2 and U2U Relay UE candidates may then determine to receive and transmit SD messages for the requested SD before the ending time, e.g., the end of the given SL SFN.

As shown by operation 430, apparatus 100, such as UE1, includes means, such as processing circuitry 20, communication interface 40, memory 60, and/or the like, for causing transmission of the SD solicitation message and the at least one of an identifier of the apparatus or an identifier allocated to the responding UE towards one or more relay UE candidates and the responding UE (whether such an identifier is included in the message or transmitted along with it). Additionally or alternatively, any optional data such as that described with respect to operation 410 and 420 may be transmitted in or with (in association with) the SD solicitation message. The SD solicitation message and any accompanying information may be broadcasted such that a relay UE and/or UE2 candidate may receive the solicitation for further processing as described with respect to FIGS. 5 and 6.

It will be appreciated that operations 400, 410, 420, and/or 430 correspond to at least partially to operation 1 of FIG. 3.

As shown by operation 440, apparatus 100, such as UE1, includes means, such as processing circuitry 20, communication interface 40, memory 60, and/or the like, for receiving a SD response from at least one of the one or more relay UE candidates. Operation 440 may correspond to operation 8 of FIG. 3. Upon receiving the SD response, the UE1 may decide to establish a connection to UE2 via one or more relay UEs selected from the one or more relay UE candidates.

Referring now to FIG. 5, an example flowchart of operations that may be performed by apparatus 100, such as a relay UE, is provided. As shown by operation 500, apparatus 100, such as a relay UE, includes means, such as processing circuitry 20, communication interface 40, memory 60, and/or the like, for in response to receiving, from an initiating user equipment (UE), a first SD solicitation message comprising or associated with at least one of an identifier of the initiating UE or an identifier allocated to a responding UE by the initiating UE, determining whether to generate and transmit a second SD solicitation message.

In this regard it will be appreciated, as described above, that the at least one of the identifier of the initiating UE or the identifier allocated to the responding UE is included in (a) the first SD solicitation message, (b) a sidelink medium access control (MAC) control element (CE) transmitted with the first SD solicitation message, or (c) sidelink control information transmitted with the first SD solicitation message. Regardless of the implementation, the relay UE receives the identifier(s) in or in association with the first SD solicitation message.

Operation 500 corresponds at least partially to operations 1 and 2 of FIG. 3, in which the first SD solicitation message may be broadcasted by UE1 and received by a relay UE. In certain embodiments, the relay UE may be configured to process the solicitation (e.g., generate and transmit a corresponding second SD solicitation message), as described in further detail below.

In certain embodiments, as described in relation to operation 410, if the first SD solicitation message includes a discovery type indicator provided by UE1, the relay UE candidate interprets the discovery type indicator accordingly. In the case of direct discovery only, the recipient relay UE candidate ignores the first SD solicitation message such that performance of the operations of FIG. 4 cease for the particular SD solicitation message.

However, it will be appreciated that certain example embodiments, in an instance it is determined to not transmit the second SD solicitation message, the relay UE may receive a SD response from a responding UE2 (similar to operation 5 of FIG. 3). In an instance a first SD response is received corresponding to the second SD solicitation not transmitted by the apparatus, the relay UE determines whether to generate and cause transmission of the second SD response to the initiating UE. For example, in some embodiments, only the transmitting relay UE of an associated SD solicitation message may further process an associated response from UE2 for provision to UE1. This may reduce signaling overhead in comparison to configurations in which every relay UE reacts to received responses. However, in some instances, a relay UE may respond to any response, such as to reduce latency.

Determining whether to send the second SD response to UE1 in such a scenario (when the recipient relay UE did not transmit the associated solicitation to the UE2) may be based on, e.g., measurements on at least one of the first SD solicitation received from UE1, or the SD announcement or the first SD response from UE2, channel busy rate (CBR), or load status at the individual relay UE candidate (above corresponding thresholds). This is because the broadcast SD announcement or the groupcast first SD response received from UE2 means to the individual relay UE candidate that there is already at least one other relay UE candidate that was able to send the second SD solicitation to UE2 and hence it may likely be able to receive the broadcast SD announcement or the groupcast first SD response from UE2 and send a unicast second SD response to UE1. Note that, in some cases, UE1 needs only one SD response from a relay UE candidate to consider the RD procedure as successful and it doesn't need to wait for other SD responses from other relay UE candidates for a relay UE selection.

Returning to the description of FIG. 5, if indirect discovery is enabled, a recipient relay UE determines to further handle the SD solicitation message, by generating and transmitting the corresponding second SD solicitation message, as described below with respect to operation 510.

As shown by operation 510, apparatus 100, such as a relay UE, includes means, such as processing circuitry 20, communication interface 40, memory 60, and/or the like, for generating the second SD solicitation message and causing transmission of the second SD solicitation message and the at least one of the identifier of the initiating UE or the identifier allocated to a responding UE towards the responding UE.

In this regard, the at least one of the identifier of the initiating UE or the identifier allocated to a responding UE may be included in the second SD solicitation message, a sidelink medium access control (MAC) control element (CE) transmitted with the second SD solicitation message, or a sidelink control information transmitted with the second SD solicitation message.

As shown by operation 520, apparatus 100, such as relay UE, includes means, such as processing circuitry 20, communication interface 40, memory 60, and/or the like, for determining a communication method by which to monitor for the first SD response based on at least one of a configuration of the apparatus (relay UE), an indication of the communication method provided by the initiating UE with or in the first SD solicitation message, a reception of the at least one of the identifier of the initiating UE or the identifier allocated to the responding UE, a service type, a Quality of Service (QoS) of service traffic, a service continuity requirement of the service type, a device type of the initiating UE, or timing information provided by the initiating UE.

An indication of the communication method provided by the initiating UE with or in the SD solicitation message may include, for example, an indication of broadcast, multicast, and/or unicast communication.

If an indication of the communication method is not received from UE1, the communication method may be determined by the relay UE dynamically and/or on a case by case basis for any or each received SD solicitation message, based on any combination of factors such as but not limited to the reception of identifier(s), service type, QoS, service continuity requirement, device type, timing information and/or the like.

Determining the communication method based on reception of indicator(s), for example, may occur by selecting multicast only if at least the identifier of the first UE is provided or both the identifier of the first user equipment and the identifier allocated to the UE2 are provided. In this regard, the identifiers are used for facilitating multicast communication.

The device type may comprise or relate to a UE capability, UE class, and/or UE capability of the UE1 and/or UE2.

It will be appreciated that the relay UE may therefore optionally receive, in or with the first SD solicitation message, timing information indicating at least one of (a) a time for which the apparatus may transmit associated SD solicitation messages to the responding UE and monitor for SD responses, or (b) a time for which the responding UE may transmit a SD response. The timing information may impact the communication method by which responses are monitored, and a time duration for which associated messages are transmitted and/or received (monitored for).

Operation 520 described above, reflects determination of a communication method for monitoring for a response. In operation 530, apparatus 100, such as a relay UE, includes means, such as processing circuitry 20, communication interface 40, memory 60, and/or the like, for monitoring for a first SD response from the responding UE, wherein the first SD response comprises or is associated with the at least one of the identifier of the initiating UE or the identifier allocated to the responding UE. Operation 530 may correspond at least partially to transmission of the response in operation 5 of FIG. 3 toward any of the relay UEs.

In operation 540, apparatus 100, such as a relay UE, includes means, such as processing circuitry 20, communication interface 40, memory 60, and/or the like, for in response to receiving the first SD response comprising or associated with the at least one of the identifier of the initiating UE or the identifier allocated to the responding UE, generating and causing transmission of a second SD response toward the initiating UE, such as provided in operation 8 of FIG. 3. The second SD response may be transmitted via unicast communication such as in Model B, to UE1. The unicast second SD response may include the actual L2 ID of UE2, as indicated in the broadcast SD announcement or the groupcast SD response received from UE2, and/or the identifier allocated to the responding UE (UE2).

Referring now to FIG. 6, an example flowchart of operations that may be performed by apparatus 100, such as UE2, is provided. In operation 600, apparatus 100, such as UE2, includes means, such as processing circuitry 20, communication interface 40, memory 60, and/or the like, for, in response to receiving at least one SD solicitation message comprising or associated with at least one of an identifier of an initiating user equipment (UE) or an identifier allocated to the apparatus by the initiating UE, generate a SD response comprising or associated with the at least one of the identifier of the initiating UE or the identifier allocated to the apparatus by the initiating UE. For example, see at least operation 4 of FIG. 3.

The at least one SD solicitation message is received from at least one relay UE and utilized as follows.

The at least one of the identifier (L2 ID) of an initiating UE or the identifier (L2 ID) allocated to the apparatus (UE2) is in or with the SD solicitation message received at UE2, and is utilized as at least one of a source (SRC) identifier or a destination (DST) identifier for transmitting the SD response. In certain embodiments, the identifier of the initiating UE (UE1) or the identifier allocated to the UE2 is included in (a) the SD response, (b) a sidelink medium access control (MAC) control element (CE) transmitted with the SD response, or (c) sidelink control information transmitted with the SD response. Transmission of the response and associated data is described in further detail below.

In operation 610, apparatus 100, such as UE2, includes means, such as processing circuitry 20, memory 60, and/or the like, for determining a communication method by which to cause transmission of the SD response based on at least one of a configuration of the apparatus, an indication of the communication method provided by the initiating UE with or in the SD solicitation message, a reception of the at least one of the identifier of the initiating UE or the identifier allocated to the apparatus by the initiating UE, a service type, a Quality of Service (QoS) of service traffic, a service continuity requirement of the service type, a device type of at least one of the apparatus or the initiating UE, or timing information provided by the initiating UE. The communication method may include a broadcast communication method such as one similar to Method A defined by 3GPP, a multicast communication method, and/or unicast communication method. In this regard, UE2 may be configured to transmit non-unicast SD (such as but not limited to broadcast and/or multicast) responses and unicast SD responses. The determination of communication method may be made based on factors similarly described above with respect to operation 520.

In operation 620, apparatus 100, such as UE2, includes means, such as processing circuitry 20, communication interface 40, memory 60, and/or the like, for causing transmission of the SD response and the at least one of the identifier of the initiating UE or the identifier allocated to the apparatus, such as via a non-unicast communication method. As described above, UE2 may be capable of transmitting responses via unicast communication method, but according to example embodiments, may advantageously utilize non-unicast communication to reduce signaling overhead.

It will be appreciated that certain embodiments may optionally further cause transmission of, in or with the SD response, a responding UE identifier of the UE2.

In operation 630, apparatus 100, such as UE2, includes means, such as processing circuitry 20, communication interface 40, memory 60, and/or the like, for precluding or stopping transmission of the SD response when an ending time indicated by the timing information is reached or after an ending time indicated by the timing information. Timing information may be provided initially by the initiating UE and further enforced, facilitated, and/or communicated by the relay UE in or with the SD solicitation message. Accordingly, example embodiments may further reduce signaling overhead otherwise expended after a specified time duration or timer.

In certain embodiments, UE2 may respond with either the broadcast SD announcement in Model A or the groupcast SD response in Model B as soon as the earliest SD solicitation is received from a relay UE candidate. UE2 may repeat or retransmit the broadcast SD announcement in Model A or the groupcast SD response in Model B over a configured or determined period of time starting from the first transmission to allow as many relay UE candidates to receive the response as possible. This may go beyond the use of a single SL Hybrid Automatic Repeat Request (HARQ) process. The configured or determined period of time may be based on the timing information in the at least one SD solicitation received from the at least one relay UE candidate.

In certain embodiments, UE2 may monitor over a configured or determined period of time starting from the time instance the earliest SD solicitation is received to receive as many second SD solicitations as possible and based on that determine to respond using unicast to send SD response to individual relay UE candidate as in the Model B operation. In this option, there may be no need for UE2 to repeat or retransmit the response beyond possible use of SL HARQ with a single process.

Accordingly, by selectively utilizing non-unicast communication for UE2 to transmit responses, as enabled by the initiation of the SD solicitation message by UE1 and the corresponding handling by a relay UE, example embodiments improve the efficiency and latency of the sidelink discovery.

Blocks of the flowcharts and message flows provided herein support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although several variations have been described in detail above, other modifications or additions are possible. Further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

That which is claimed is:

1. An apparatus comprising at least one processor and at least one memory including computer program code, the at least one memory and the computer program code configured to, with the at least one processor, cause the apparatus to at least:

in response to receiving at least one sidelink discovery solicitation message comprising or associated with an identifier of an initiating user equipment (UE) and an identifier allocated to the apparatus by the initiating UE, generate a sidelink discovery response comprising or associated with the identifier of the initiating UE and the identifier allocated to the apparatus by the initiating UE;

cause transmission of the sidelink discovery response comprising or associated with the identifier of the initiating UE and the identifier allocated to the apparatus by the initiating UE via a non-unicast communication method, and cause transmission of, in or with the sidelink discovery response, a responding UE identifier of the apparatus;

wherein the responding UE identifier of the apparatus, the identifier of the initiating UE and the identifier allocated to the apparatus by the initiating UE comprise layer 2 (L2) identifiers;

wherein the identifier allocated to the apparatus by the initiating UE is utilized as a source identifier for transmitting the sidelink discovery response; and wherein the responding UE identifier of the apparatus is different from the identifier allocated to the apparatus by the initiating UE.

2. The apparatus according to claim 1, wherein the at least one sidelink discovery solicitation message is received from at least one relay UE.

3. The apparatus according to claim 1, wherein the sidelink discovery response is caused to be transmitted via a broadcast communication method.

4. The apparatus according to claim 3, wherein the sidelink discovery response is caused to be transmitted as a sidelink discovery announcement according to Model A defined by 3rd Generation Partnership Project (3GPP).

5. The apparatus according to claim 1, wherein the sidelink discovery response is caused to be transmitted via a multicast communication method.

6. The apparatus according to claim 1, wherein the apparatus is configured to cause transmission of unicast sidelink discovery responses and non-unicast sidelink discovery responses.

7. The apparatus according to claim 1, wherein the at least one sidelink discovery solicitation message comprises or is associated with timing information, and the at least one memory and the computer program code are further configured to, with the at least one processor, cause the apparatus to at least:

preclude or stop transmission of the sidelink discovery response when or after an ending time indicated by the timing information.

8. The apparatus according to claim 1, wherein the at least one memory and the computer program code are further configured to, with the at least one processor, cause the apparatus to at least:

determine a communication method by which to cause transmission of the sidelink discovery response based on at least one of a configuration of the apparatus, an indication of the communication method provided by the initiating UE with or in the sidelink discovery solicitation message, a reception of the at least one of the identifier of the initiating UE or the identifier allocated to the apparatus by the initiating UE, a service type, a Quality of Service (QoS) of service traffic, a service continuity requirement of the service type, a device type of at least one of the apparatus or the initiating UE, or timing information provided by the initiating UE.

9. The apparatus according to claim 1, wherein the at least one of the identifier of the initiating UE or the identifier allocated to the apparatus is included in (a) the sidelink discovery response, (b) a sidelink medium access control (MAC) control element (CE) transmitted with the sidelink discovery response, or (c) sidelink control information transmitted with the sidelink discovery response.

10. An apparatus comprising at least one processor and at least one memory including computer program code, the at least one memory and the computer program code configured to, with the at least one processor, cause the apparatus to at least:

generate a sidelink discovery solicitation message comprising or associated with an identifier of the apparatus and an identifier allocated to a responding user equipment (UE) by the apparatus; and cause transmission of the sidelink discovery solicitation message and the identifier of the apparatus and the identifier allocated to the responding UE towards one or more relay UE candidates and the responding UE, wherein the identifier of the apparatus and the identifier allocated to the responding UE by the apparatus comprise layer 2 (L2) identifiers; and wherein the identifier allocated to the responding UE by the apparatus is different from a responding UE identifier of the responding UE.

11. The apparatus according to claim 10, wherein the at least one memory and the computer program code are further configured to, with the at least one processor, cause the apparatus to at least:

further cause transmission of, in or with the sidelink discovery solicitation message, a discovery type indicator, indicating (a) direct discovery, (b) indirect discovery via one or more relay UE candidates, or (c) both indirect discovery and direct discovery.

12. The apparatus according to claim 10, wherein the at least one memory and the computer program code are further configured to, with the at least one processor, cause the apparatus to at least:

further cause transmission of, in or with the sidelink discovery solicitation message, timing information indicating at least one of (a) a time for which at least one of the one or more relay UE candidates may transmit associated sidelink discovery solicitation messages to the responding UE and monitor for sidelink discovery responses, or (b) a time for which the responding UE may transmit a sidelink discovery response.

13. The apparatus according to claim 10, wherein at least one of the identifier of the apparatus or the identifier allocated to the responding UE is included in (a) the sidelink discovery solicitation message, (b) a sidelink medium access control (MAC) control element (CE) transmitted with the sidelink discovery solicitation message, or (c) sidelink control information transmitted with the sidelink discovery solicitation message.

14. The apparatus according to claim 10, wherein the sidelink discovery solicitation message further comprises higher layer identifying information protected from the one or more relay UE candidates.

15. The apparatus according to claim 10, wherein the at least one memory and the computer program code are further configured to, with the at least one processor, cause the apparatus to at least:

receive a sidelink discovery response from at least one of the one or more relay UE candidates.

16. An apparatus comprising at least one processor and at least one memory including computer program code, the at least one memory and the computer program code configured to, with the at least one processor, cause the apparatus to at least:

in response to receiving, from an initiating user equipment (UE), a first sidelink discovery solicitation message comprising or associated with an identifier of the initiating UE and an identifier allocated to a responding UE by the initiating UE, determine whether to generate and transmit a second sidelink discovery solicitation message; and in an instance it is determined to generate and transmit the second sidelink discovery solicitation message:

generate the second sidelink discovery solicitation message and cause transmission of the second sidelink discovery solicitation message and the identifier of the initiating UE and the identifier allocated to the responding UE by the initiating UE towards the responding UE; and monitor for a first sidelink discovery response from the responding UE, wherein the first sidelink discovery response comprises or is associated with the identifier of the initiating UE and the identifier allocated to the responding UE by the initiating UE; wherein the identifier allocated to the apparatus by the initiating UE is utilized as a source identifier for transmitting the first sidelink discovery response;

wherein a responding UE identifier of the responding UE is transmitted in or with the first sidelink discovery response, wherein the responding UE identifier of the responding UE, the identifier of the initiating UE and the identifier allocated to the responding UE by the apparatus comprise layer 2 (L2) identifiers; and wherein the responding UB identifier of the responding UE is different from the identifier allocated to the responding UB by the initiating UB.

17. The apparatus according to claim 16, wherein the at least one memory and the computer program code are further configured to, with the at least one processor, cause the apparatus to at least:

in response to receiving the first sidelink discovery response comprising or associated with the identifier of the initiating UE and the identifier allocated to the responding UE, generate and cause transmission of a second sidelink discovery response toward the initiating UE.

18. The apparatus according to claim 16, wherein the monitoring for the first sidelink discovery response comprises monitoring for the first sidelink discovery response transmitted via a communication method comprising at least one of a multicast communication method or a broadcast communication method.

19. The apparatus according to claim 16, wherein the at least one memory and the computer program code are further configured to, with the at least one processor, cause the apparatus to at least:

determine a communication method by which to monitor for the first sidelink discovery response based on at least one of a configuration of the apparatus, an indication of the communication method provided by the initiating UE with or in the sidelink discovery solicitation message, a reception of the at least one of the identifier of the initiating UE or the identifier allocated to the responding UE, a service type, a Quality of Service (QOS) of service traffic, a service continuity requirement of the service type, a device type of at least one of the initiating UE or the responding UE, or timing information provided by the initiating UE.

20. The apparatus according to claim 16, wherein the at least one memory and the computer program code are further configured to, with the at least one processor, cause the apparatus to at least:

in an instance it is determined to not transmit the second sidelink discovery solicitation message, and a first sidelink discovery response is received corresponding to the second sidelink discovery solicitation not transmitted by the apparatus, determine whether to generate and cause transmission of the second sidelink discovery response to the initiating UE.

21. The apparatus according to claim 16, wherein the at least one memory and the computer program code are further configured to, with the at least one processor, cause the apparatus to at least:

receive, in or with the sidelink discovery solicitation message, timing information indicating at least one of (a) a time for which the apparatus may transmit associated sidelink discovery solicitation messages to the responding UE and monitor for sidelink discovery responses, or (b) a time for which the responding UE may transmit a sidelink discovery response.

* * * * *